(12) United States Patent
Lee et al.

(10) Patent No.: US 6,765,625 B1
(45) Date of Patent: Jul. 20, 2004

(54) METHOD AND APPARATUS FOR BIT-SHUFFLING VIDEO DATA

(75) Inventors: Wilbur W. Lee, Mountain View, CA (US); Ren-Yuh Wang, Cupertino, CA (US)

(73) Assignee: Divio, Inc., Sunnyvale, CA (US)

( * ) Notice: Subject to any disclaimer, the term of this patent is extended or adjusted under 35 U.S.C. 154(b) by 126 days.

(21) Appl. No.: 09/595,815

(22) Filed: Jun. 16, 2000

Related U.S. Application Data (63) Continuation of application No. 09/425,487, filed on Oct. 22, 1999, now abandoned, which is a continuation of application No. 09/263,961, filed on Mar. 5, 1999, now abandoned.
(60) Provisional application No. 60/077,376, filed on Mar. 9, 1998.

(51) Int. Cl.[7] .................................................. H04N 9/64
(52) U.S. Cl. ................... 348/714; 348/716; 375/240.24
(58) Field of Search ................................ 348/714–721, 348/14.01, 14.13, 446, 448; 725/142; 386/39; 375/240.24

(56) References Cited

U.S. PATENT DOCUMENTS

| | | | | |
|---|---|---|---|---|
| 5,363,138 A | * | 11/1994 | Hayashi et al. | 348/390.1 |
| 5,486,876 A | * | 1/1996 | Lew et al. | 345/535 |
| 5,524,194 A | * | 6/1996 | Chida et al. | 345/710 |
| 5,561,465 A | * | 10/1996 | Fautier et al. | 375/240.12 |
| 5,568,165 A | * | 10/1996 | Kimura | 345/547 |
| 5,646,695 A | * | 7/1997 | Fujiwara et al. | 348/448 |
| 5,675,383 A | * | 10/1997 | Yagasaki et al. | 348/390.1 |
| 5,677,740 A | * | 10/1997 | Sato et al. | 348/553 |
| 5,736,944 A | * | 4/1998 | Kurihara | 341/50 |
| 5,751,722 A | * | 5/1998 | Maekawa | 348/14.01 |
| 5,781,242 A | * | 7/1998 | Kondo et al. | 348/441 |
| 5,909,224 A | * | 6/1999 | Fung | 345/531 |
| 5,923,385 A | * | 7/1999 | Mills et al. | 348/439.1 |
| 5,943,102 A | * | 8/1999 | Hoshi | 348/715 |
| 5,949,441 A | * | 9/1999 | Ristau | 345/533 |
| 5,982,441 A | * | 11/1999 | Hurd et al. | 348/417.1 |
| 5,990,976 A | * | 11/1999 | Higashida | 348/588 |
| 6,028,635 A | * | 2/2000 | Owen et al. | 348/699 |
| 6,064,803 A | * | 5/2000 | Watabe et al. | 358/1.17 |
| 6,072,548 A | * | 6/2000 | Schoner et al. | 345/520 |
| 6,141,055 A | * | 10/2000 | Li | 348/446 |
| 6,144,403 A | * | 11/2000 | Otani | 348/14.12 |
| 6,195,131 B1 | * | 2/2001 | Kaneko | 348/561 |
| 6,198,773 B1 | * | 3/2001 | Gill et al. | 348/716 |
| 6,266,104 B1 | * | 7/2001 | Kim | 348/714 |
| 6,301,299 B1 | * | 10/2001 | Sita et al. | 348/714 |
| 6,342,895 B1 | * | 1/2002 | Kim | 345/531 |
| 6,356,317 B1 | * | 3/2002 | Watabe et al. | 348/715 |
| 6,411,341 B1 | * | 6/2002 | De Haan et al. | 348/714 |
| 6,427,194 B1 | * | 7/2002 | Owen et al. | 711/151 |

* cited by examiner

*Primary Examiner*—Victor R. Kostak
(74) *Attorney, Agent, or Firm*—Townsend and Townsend and Crew LLP (57) ABSTRACT

"An image processing system, in which bit shuffling is done in order to maintain image quality, stores digitized video data bits stream in a conventional memory, such as a DRAM. The image processing system is suitable for widely-used image compression standards that integrate various algorithms into a compression system, such as the standards specified in the Digital Video Standard (the DV-SD standard, or "Blue Book"). The image processing system receives a number of blocks associated with a first video frame and stores these blocks in the DRAM. The image processing system receives and stores blocks associated with a second video frame in the DRAM. The image processing system, processes the blocks of the first video frame while storing the blocks of the second video fame."

3 Claims, 10 Drawing Sheets

Super block S i,0, S i,2 (i = 0, ..., 9)

| 0 | 11 | 12 | 23 | 24 |
|---|----|----|----|----|
| 1 | 10 | 13 | 22 | 25 |
| 2 | 9  | 14 | 21 | 26 |
| 3 | 8  | 15 | 20 |    |
| 4 | 7  | 16 | 19 |    |
| 5 | 6  | 17 | 18 |    |

Super block S i,1, S i,3 (i = 0, ..., 9)

|   | 8 | 9  | 20 | 21 |
|---|---|----|----|----|
|   | 7 | 10 | 19 | 22 |
|   | 6 | 11 | 18 | 23 |
| 0 | 5 | 12 | 17 | 24 |
| 1 | 4 | 13 | 16 | 25 |
| 2 | 3 | 14 | 15 | 26 |

Super block S i,4 (i = 0, ..., 9)

| 0 | 11 | 12 | 23 | 24 |
|---|----|----|----|----|
| 1 | 10 | 13 | 22 |    |
| 2 | 9  | 14 | 21 | 25 |
| 3 | 8  | 15 | 20 |    |
| 4 | 7  | 16 | 19 | 26 |
| 5 | 6  | 17 | 18 |    |

*FIG. 3*

Super block S i,j (i = 0, ..., 11, j = 0, ..., 4))

| 0 | 5 | 6 | 11 | 12 | 17 | 18 | 23 | 24 |
|---|---|---|----|----|----|----|----|----|
| 1 | 4 | 7 | 10 | 13 | 16 | 19 | 22 | 25 |
| 2 | 3 | 8 | 9  | 14 | 15 | 20 | 21 | 26 |

4:1:1 compression shuffling table

| SB n,0 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | A | B | C | D | E | F | 0 | 1 | 2 | 3 |
| Frame 3 | 4 | 5 | 6 | 7 | 8 | 9 | A | B | C | D |
| Frame 4 | E | F | 0 | 1 | 2 | 3 | 4 | 5 | 6 | 7 |
| Frame 5 | 8 | 9 | A | B | C | D | E | F | 0 | 1 |
| Frame 6 | 2 | 3 | 4 | 5 | 6 | 7 | 8 | 9 | A | B |
| Frame 7 | C | D | E | F | 0 | 1 | 2 | 3 | 4 | 5 |
| Frame 8 | 6 | 7 | 8 | 9 | A | B | C | D | E | F |
| Frame 9 | Repeat... | | | | | | | | | |

| SB n,1 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | A | B | C | D | E | F | 6 | 7 | 8 | 9 |
| Frame 3 | Repeat... | | | | | | | | | |

| SB n,2 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | A | B | C | D | E | F | 10 | 11 | 12 | 13 |
| Frame 3 | Repeat... | | | | | | | | | |

| SB n,3 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | A | B | C | D | E | F | 10 | 11 | 8 | 9 |
| Frame 3 | Repeat... | | | | | | | | | |

| SB n,4 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | A | B | C | D | E | F | 10 | 11 | 12 | 13 |
| Frame 3 | Repeat... | | | | | | | | | |

*FIG. 7*

4:2:0 compression shuffling table

| SB n,0 | 0 | 1 | 2 | 3 | 4 | 5 | 6 | 7 | 8 | 9 | 10 | 11 |
|---|---|---|---|---|---|---|---|---|---|---|---|---|
| Frame 1 | 0 | 1 | 2 | 3 | 4 | 5 | 6 | 7 | 8 | 9 | A | B |
| Frame 2 | C | D | E | F | 10 | 11 | 0 | 1 | 2 | 3 | 4 | 5 |
| Frame 3 | 6 | 7 | 8 | 9 | A | B | C | D | E | F | 10 | 11 |
| Frame 4 | Repeat... | | | | | | | | | | | |
| SB n,1 | 0 | 1 | 2 | 3 | 4 | 5 | 6 | 7 | 8 | 9 | 10 | 11 |
| Frame 1 | 0 | 1 | 2 | 3 | 4 | 5 | 6 | 7 | 8 | 9 | A | B |
| Frame 2 | C | D | E | F | 10 | 11 | 6 | 7 | 8 | 9 | A | B |
| Frame 3 | Repeat... | | | | | | | | | | | |
| SB n,2 | 0 | 1 | 2 | 3 | 4 | 5 | 6 | 7 | 8 | 9 | 10 | 11 |
| Frame 1 | 0 | 1 | 2 | 3 | 4 | 5 | 6 | 7 | 8 | 9 | A | B |
| Frame 2 | C | D | E | F | 10 | 11 | 12 | 13 | 2 | 3 | 4 | 5 |
| Frame 3 | 6 | 7 | 8 | 9 | A | B | 0 | 1 | E | F | 10 | 11 |
| Frame 4 | 12 | 13 | 2 | 3 | 4 | 5 | C | D | 8 | 9 | A | B |
| Frame 5 | 0 | 1 | E | F | 10 | 11 | 6 | 7 | 2 | 3 | 4 | 5 |
| Frame 6 | C | D | 8 | 9 | A | B | 12 | 13 | E | F | 10 | 11 |
| Frame 7 | 6 | 7 | 2 | 3 | 4 | 5 | 0 | 1 | 8 | 9 | A | B |
| Frame 8 | 12 | 13 | E | F | 10 | 11 | C | D | 2 | 3 | 4 | 5 |
| Frame 9 | 0 | 1 | 8 | 9 | A | B | 6 | 7 | E | F | 10 | 11 |
| Frame 10 | C | D | 2 | 3 | 4 | 5 | 12 | 13 | 8 | 9 | A | B |
| Frame 11 | 6 | 7 | E | F | 10 | 11 | 0 | 1 | 2 | 3 | 4 | 5 |
| Frame 12 | 12 | 13 | 8 | 9 | A | B | C | D | E | F | 10 | 11 |
| Frame 13 | Repeat... | | | | | | | | | | | |
| SB n,3 | 0 | 1 | 2 | 3 | 4 | 5 | 6 | 7 | 8 | 9 | 10 | 11 |
| Frame 1 | 0 | 1 | 2 | 3 | 4 | 5 | 6 | 7 | 8 | 9 | A | B |
| Frame 2 | C | D | E | F | 10 | 11 | 8 | 9 | A | B | 0 | 1 |
| Frame 3 | 2 | 3 | 4 | 5 | 6 | 7 | A | B | 0 | 1 | C | D |
| Frame 4 | E | F | 10 | 11 | 8 | 9 | 0 | 1 | C | D | 2 | 3 |
| Frame 5 | 4 | 5 | 6 | 7 | A | B | C | D | 2 | 3 | E | F |
| Frame 6 | 10 | 11 | 8 | 9 | 0 | 1 | 2 | 3 | E | F | 4 | 5 |
| Frame 7 | 6 | 7 | A | B | C | D | E | F | 4 | 5 | 10 | 11 |
| Frame 8 | 8 | 9 | 0 | 1 | 2 | 3 | 4 | 5 | 10 | 11 | 6 | 7 |
| Frame 9 | A | B | C | D | E | F | 10 | 11 | 6 | 7 | 8 | 9 |
| Frame 10 | Repeat... | | | | | | | | | | | |
| SB n,4 | 0 | 1 | 2 | 3 | 4 | 5 | 6 | 7 | 8 | 9 | 10 | 11 |
| Frame 1 | 0 | 1 | 2 | 3 | 4 | 5 | 6 | 7 | 8 | 9 | A | B |
| Frame 2 | C | D | E | F | 10 | 11 | 4 | 5 | 6 | 7 | 8 | 9 |
| Frame 3 | A | B | 0 | 1 | 2 | 3 | 10 | 11 | 4 | 5 | 6 | 7 |
| Frame 4 | 8 | 9 | C | D | E | F | 2 | 3 | 10 | 11 | 4 | 5 |
| Frame 5 | 6 | 7 | A | B | 0 | 1 | E | F | 2 | 3 | 10 | 11 |
| Frame 6 | 4 | 5 | 8 | 9 | C | D | 0 | 1 | E | F | 2 | 3 |
| Frame 7 | 10 | 11 | 6 | 7 | A | B | C | D | 0 | 1 | E | F |
| Frame 8 | 2 | 3 | 4 | 5 | 8 | 9 | A | B | C | D | 0 | 1 |
| Frame 9 | E | F | 10 | 11 | 6 | 7 | 8 | 9 | A | B | C | D |
| Frame 10 | Repeat... | | | | | | | | | | | |

*FIG. 8*

4:1:1 decompression shuffling

| SB n,0 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | A | B | C | D | E | F | 0 | 1 | 2 | 3 |
| Frame 3 | 4 | 5 | 6 | 7 | 8 | 9 | A | B | C | D |
| Frame 4 | E | F | 0 | 1 | 2 | 3 | 4 | 5 | 6 | 7 |
| Frame 5 | 8 | 9 | A | B | C | D | E | F | 0 | 1 |
| Frame 6 | 2 | 3 | 4 | 5 | 6 | 7 | 8 | 9 | A | B |
| Frame 7 | C | D | E | F | 0 | 1 | 2 | 3 | 4 | 5 |
| Frame 8 | 6 | 7 | 8 | 9 | A | B | C | D | E | F |
| Frame 9 | Repeat... | | | | | | | | | |

| SB n,1 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | A | B | C | D | E | F | 10 | 11 | 12 | 13 |
| Frame 3 | Repeat... | | | | | | | | | |

| SB n,2 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | 0 | 1 | A | B | C | D | E | F | 10 | 11 |
| Frame 3 | Repeat... | | | | | | | | | |

| SB n,3 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | A | B | C | D | E | F | 10 | 11 | 12 | 13 |
| Frame 3 | Repeat... | | | | | | | | | |

| SB n,4 | 0 | 1 | 2 | 3 | 4 | 5 | 6 | 7 | 8 | 9 |
|---|---|---|---|---|---|---|---|---|---|---|
| Frame 1 | 0 | 1 | 2 | 3 | 4 | 5 | 6 | 7 | 8 | 9 |
| Frame 2 | 0 | 1 | 2 | 3 | A | B | C | D | E | F |
| Frame 3 | Repeat... | | | | | | | | | |

*FIG. 9*

4:2:0 decompression shuffling

| SB n,0 | 0 | 1 | 2 | 3 | 4 | 5 | 6 | 7 | 8 | 9 | 10 | 11 |
|---|---|---|---|---|---|---|---|---|---|---|---|---|
| Frame 1 | 0 | 1 | 2 | 3 | 4 | 5 | 6 | 7 | 8 | 9 | A | B |
| Frame 2 | C | D | E | F | 10 | 11 | 0 | 1 | 2 | 3 | 4 | 5 |
| Frame 3 | 6 | 7 | 8 | 9 | A | B | C | D | E | F | 10 | 11 |
| Frame 4 | Repeat... | | | | | | | | | | | |

| SB n,1 | 0 | 1 | 2 | 3 | 4 | 5 | 6 | 7 | 8 | 9 | 10 | 11 |
|---|---|---|---|---|---|---|---|---|---|---|---|---|
| Frame 1 | 0 | 1 | 2 | 3 | 4 | 5 | 6 | 7 | 8 | 9 | A | B |
| Frame 2 | 0 | 1 | 2 | 3 | 4 | 5 | C | D | E | F | 10 | 11 |
| Frame 3 | Repeat... | | | | | | | | | | | |

| SB n,2 | 0 | 1 | 2 | 3 | 4 | 5 | 6 | 7 | 8 | 9 | 10 | 11 |
|---|---|---|---|---|---|---|---|---|---|---|---|---|
| Frame 1 | 0 | 1 | 2 | 3 | 4 | 5 | 6 | 7 | 8 | 9 | A | B |
| Frame 2 | 2 | 3 | C | D | E | F | 10 | 11 | 12 | 13 | 0 | 1 |
| Frame 3 | C | D | 4 | 5 | 6 | 7 | 8 | 9 | A | B | 2 | 3 |
| Frame 4 | 4 | 5 | E | F | 10 | 11 | 12 | 13 | 0 | 1 | C | D |
| Frame 5 | E | F | 6 | 7 | 8 | 9 | A | B | 2 | 3 | 4 | 5 |
| Frame 6 | 6 | 7 | 10 | 11 | 12 | 13 | 0 | 1 | C | D | E | F |
| Frame 7 | 10 | 11 | 8 | 9 | A | B | 2 | 3 | 4 | 5 | 6 | 7 |
| Frame 8 | 8 | 9 | 12 | 13 | 0 | 1 | C | D | E | F | 10 | 11 |
| Frame 9 | 12 | 13 | A | B | 2 | 3 | 4 | 5 | 6 | 7 | 8 | 9 |
| Frame 11 | A | B | 0 | 1 | C | D | E | F | 10 | 11 | 12 | 13 |
| Frame 12 | Repeat... | | | | | | | | | | | |

| SB n,3 | 0 | 1 | 2 | 3 | 4 | 5 | 6 | 7 | 8 | 9 | 10 | 11 |
|---|---|---|---|---|---|---|---|---|---|---|---|---|
| Frame 1 | 0 | 1 | 2 | 3 | 4 | 5 | 6 | 7 | 8 | 9 | A | B |
| Frame 2 | 10 | 11 | 0 | 1 | 2 | 3 | 4 | 5 | C | D | E | F |
| Frame 3 | A | B | 10 | 11 | 0 | 1 | 2 | 3 | 6 | 7 | 8 | 9 |
| Frame 4 | E | F | A | B | 10 | 11 | 0 | 1 | 4 | 5 | C | D |
| Frame 5 | 8 | 9 | E | F | A | B | 10 | 11 | 2 | 3 | 6 | 7 |
| Frame 6 | C | D | 8 | 9 | E | F | A | B | 0 | 1 | 4 | 5 |
| Frame 7 | 6 | 7 | C | D | 8 | 9 | E | F | 10 | 11 | 2 | 3 |
| Frame 8 | 4 | 5 | 6 | 7 | C | D | 8 | 9 | A | B | 0 | 1 |
| Frame 9 | 2 | 3 | 4 | 5 | 6 | 7 | C | D | E | F | 10 | 11 |
| Frame 10 | Repeat... | | | | | | | | | | | |

| SB n,4 | 0 | 1 | 2 | 3 | 4 | 5 | 6 | 7 | 8 | 9 | 10 | 11 |
|---|---|---|---|---|---|---|---|---|---|---|---|---|
| Frame 1 | 0 | 1 | 2 | 3 | 4 | 5 | 6 | 7 | 8 | 9 | A | B |
| Frame 2 | 2 | 3 | 4 | 5 | C | D | E | F | 10 | 11 | 0 | 1 |
| Frame 3 | 4 | 5 | C | D | 6 | 7 | 8 | 9 | A | B | 2 | 3 |
| Frame 4 | C | D | 6 | 7 | E | F | 10 | 11 | 0 | 1 | 4 | 5 |
| Frame 5 | 6 | 7 | E | F | 8 | 9 | A | B | 2 | 3 | C | D |
| Frame 6 | E | F | 8 | 9 | 10 | 11 | 0 | 1 | 4 | 5 | 6 | 7 |
| Frame 7 | 8 | 9 | 10 | 11 | A | B | 2 | 3 | C | D | E | F |
| Frame 8 | 10 | 11 | A | B | 0 | 1 | 4 | 5 | 6 | 7 | 8 | 9 |
| Frame 9 | A | B | 0 | 1 | 2 | 3 | C | D | E | F | 10 | 11 |
| Frame 10 | Repeat... | | | | | | | | | | | |

*FIG. 10*

NTSC super block Sn,0 Sn,2 (n = 0 ... 9)

| | S n,0 | | | | |
|---|---|---|---|---|---|
| DRAM Page | | | | | |
| 0 | n-0 | n-11 | n-12 | n-23 | n-24 |
| 1 | n-1 | n-10 | n-13 | n-22 | n-25 |
| 2 | n-2 | n-9 | n-14 | n-21 | n-26 |
| 3 | n-3 | n-8 | n-15 | n-20 | n+1-5 |
| 4 | n-4 | n-7 | n-16 | n-19 | n+1-6 |
| 5 | n-5 | n-6 | n-17 | n-18 | n+1-17 |
| | S (n+1),0 | | | | |
| 6 | n+1-0 | n+1-11 | n+1-12 | n+1-23 | n+1-24 |
| 7 | n+1-1 | n+1-10 | n+1-13 | n+1-22 | n+1-25 |
| 8 | n+1-2 | n+1-9 | n+1-14 | n+1-21 | n+1-26 |
| 9 | n+1-3 | n+1-8 | n+1-15 | n+1-20 | n+1-18 (no use) |
| 10 | n+1-4 | n+1-7 | n+1-16 | n+1-19 | |
| | n+1-5 | n+1-6 | n+1-17 | n+1-18 | |

FIG. 11A

NTSC super block Sn,1 Sn,3 (n = 0 ... 9)

| | S n,1 | | | | |
|---|---|---|---|---|---|
| DRAM Page | | | | | |
| 0 | n+1-2 | n-8 | n-9 | n-20 | n-21 |
| 1 | n+1-3 | n-7 | n-10 | n-19 | n-22 |
| 2 | n+1-14 | n-6 | n-11 | n-18 | n-23 |
| 3 | n-0 | n-5 | n-12 | n-17 | n-24 |
| 4 | n-1 | n-4 | n-13 | n-16 | n-25 |
| 5 | n-2 | n-3 | n-14 | n-15 | n-26 |
| | S (n+1),1 | | | | |
| 6 | n+1-15 | n+1-8 | n+1-9 | n+1-20 | n+1-21 |
| 7 | n+1-26 | n+1-7 | n+1-10 | n+1-19 | n+1-22 |
| 8 | (no use) | n+1-6 | n+1-11 | n+1-18 | n+1-23 |
| 9 | n+1-0 | n+1-5 | n+1-12 | n+1-17 | n+1-24 |
| 10 | n+1-1 | n+1-4 | n+1-13 | n+1-16 | n+1-25 |
| | n+1-2 | n+1-3 | n+1-14 | n+1-15 | n+1-26 |

FIG. 11B

NTSC super block Sn,4 (n = 0 ... 9)

| DRAM Page | S n,0 | | | | |
|---|---|---|---|---|---|
| 0 | n-0 | n-11 | n-12 | n-23 | n-24 |
| 1 | n-1 | n-10 | n-13 | n-22 | n+1-5 |
| 2 | n-2 | n-9 | n-14 | n-21 | n-25 |
| 3 | n-3 | n-8 | n-15 | n-20 | n+1-6 |
| 4 | n-4 | n-7 | n-16 | n-19 | n-26 |
| 5 | n-5 | n-6 | n-17 | n-18 | n+1-17 |
| | S (n+1),0 | | | | |
| 6 | n+1-0 | n+1-11 | n+1-12 | n+1-23 | n+1-24 |
| 7 | n+1-1 | n+1-10 | n+1-13 | n+1-22 | n+1-18 |
| 8 | n+1-2 | n+1-9 | n+1-14 | n+1-21 | n+1-25 |
| 9 | n+1-3 | n+1-8 | n+1-15 | n+1-20 | (no use) |
| 10 | n+1-4 | n+1-7 | n+1-16 | n+1-19 | n+1-25 |
| | n+1-5 | n+1-6 | n+1-17 | n+1-18 | |

FIG. 11C

PAL super block Sn,0 Sn,2 Sn,4 (n = 0 ... 11)

| DRAM Page | S n,0 | | | | | DRAM Page | | | | | |
|---|---|---|---|---|---|---|---|---|---|---|---|
| 0 | n-0 | n-5 | n-6 | n-11 | n-12 | 1 | n-17 | n-18 | n-23 | n-24 | n+1-15 |
| 2 | n-1 | n-4 | n-7 | n-10 | n-13 | 3 | n-16 | n-19 | n-22 | n-25 | n+1-20 |
| 4 | n-2 | n-3 | n-8 | n-9 | n-14 | 5 | n-15 | n-20 | n-21 | n-26 | n+1-21 |
| | S (n+1),0 | | | | | | | | | | |
| 6 | n+1-0 | n+1-5 | n+1-6 | n+1-11 | n+1-12 | 7 | n+1-17 | n+1-18 | n+1-23 | n+1-24 | n+1-26 |
| 8 | n+1-1 | n+1-4 | n+1-7 | n+1-10 | n+1-13 | 9 | n+1-16 | n+1-19 | n+1-22 | n+1-25 | no use |
| 10 | n+1-2 | n+1-3 | n+1-8 | n+1-9 | n+1-14 | | n+1-15 | n+1-20 | n+1-21 | n+1-26 | |

FIG. 11D

METHOD AND APPARATUS FOR BIT-SHUFFLING VIDEO DATA

CROSS-REFERENCES TO RELATED APPLICATIONS

This application claims priority from application Ser. No. 09/425,487, filed on Oct. 22, 1999, which claims priority from application Ser. No. 09/263,961, filed on Mar. 5, 1999, which claims priority from application Ser. No. 60/077,376, filed on Mar. 9, 1998, all of which are incorporated herein by reference in their entireties for all purposes.

BACKGROUND OF THE INVENTION

The present invention relates to the field of image processing. More specifically, the present invention relates to methods and apparatus for storing a bitstream of digitized video data. Moreover, the present invention is capable of performing such storage using standard dynamic random-access memory (DRAM). This technique is especially suited to digital video applications, where such shuffling is done in order to maintain acceptable image quality. This implementation is suitable for widely-used image compression standards that integrate various algorithms into a compression system, such as the standards specified in the Digital Video Standard (the DV-SD standard, or "Blue Book"), which is included herein by reference in its entirety.

The DV-SD digital video standard outlines the breakdown of a video frame into superblocks and further, into macroblocks (and yet further, into blocks). This is shown in FIGS. 1, 2, 3, and 4. The data is received on a frame-by-frame basis. This data is stored in a frame buffer memory. Compressed video data is transferred in a staggered order, in order to avoid picture degradation. This is done by processing and transmitting the compressed video data in an out-of-order sequence, sending superblock from varied locations in the picture. Thus, if noise is encountered, it appears at several different locations in the picture, rather than clumped together in one area. The former is much more difficult for the human eye to detect, and so picture quality is improved, from a subjective viewpoint.

To simplify the reading and writing of such data, a memory system would normally have enough storage to hold two (or more) frames, and write one while the other was being written. However, due to the size of the video frames and the storage schemes that may be employed, the data for a single video frame requires an odd amount of storage space. One possible solution is to use special purpose memory chips. Such chips would have the proper amount of storage space and addressing to allow whole video frames to be dealt with. Unfortunately, such a solution is expensive. Moreover, such a solution is likely incompatible with other such solutions.

Alternatively, enough standard memory (e.g., DRAM memory) could be used to store two (or more) frames. However, this would result in a large amount of wasted space. While this might be more economical than the use of specialized memories, it would nonetheless cost more than necessary.

What is therefore required is a technique which allows the use of standard memory (e.g., DRAM memory) that uses a minimal amount of-memory while providing the requisite processing throughput.

SUMMARY OF THE INVENTION

The present invention solves the problems associated with the prior art by providing methods and apparatus for efficiently and accurately compressing video data.

In one embodiment, a circuit is disclosed for processing audio and video data utilizing conventional DRAMs.

These and other embodiments of the present invention, as well as its advantages and features are described in more detail in conjunction with the text below and attached figures.

DESCRIPTION OF THE SPECIFIC EMBODIMENTS

Figure 1:
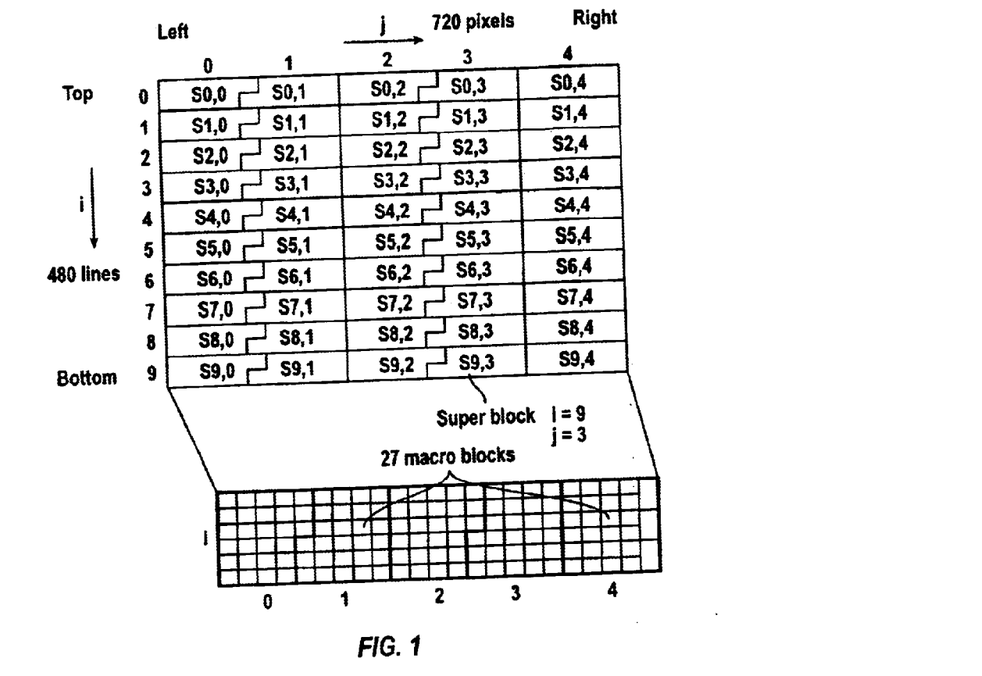
FIG. 1 illustrates a block diagram of an NTSC video frame divided into superblock, and the division of the superblocks into macroblocks.
Figure 2:
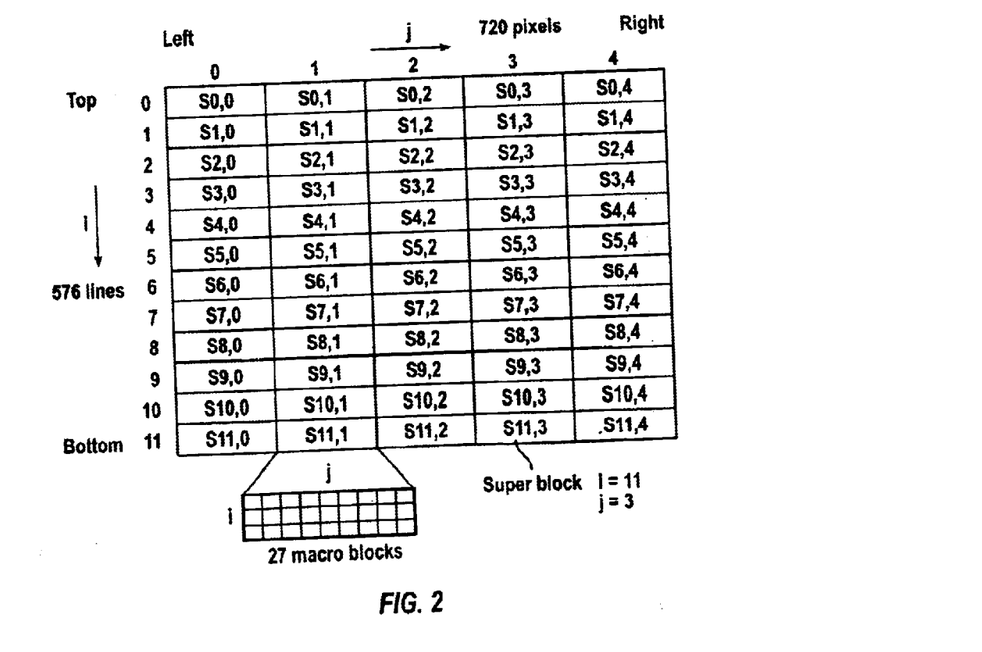
FIG. 2 illustrates a block diagram of an PAL video frame divided into superblock, and the division of the superblocks into macroblocks.
Figure 3:
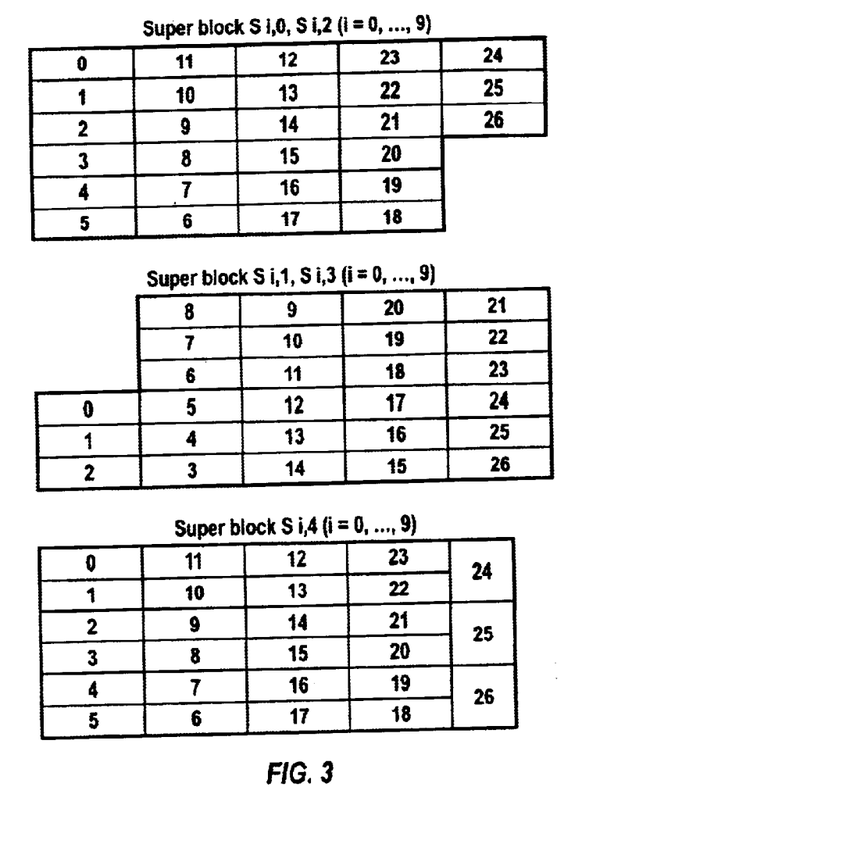
FIG. 3 illustrates a block diagram of the three types of NTSC superblocks, and their division into macroblocks.
Figure 4:
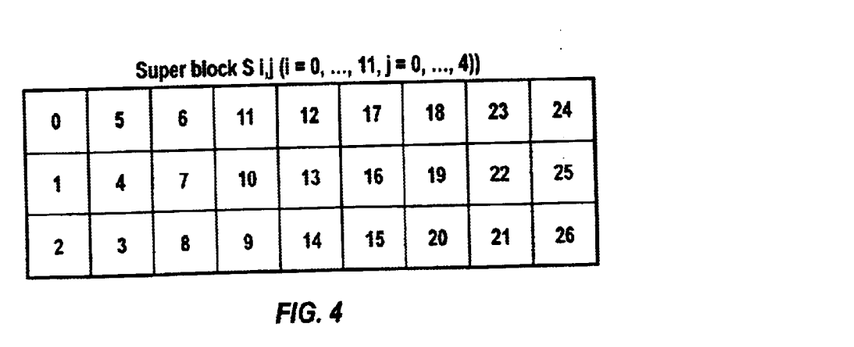
FIG. 4 illustrates a block diagram of a PAL superblock, and its division into macroblocks.
Figure 5:
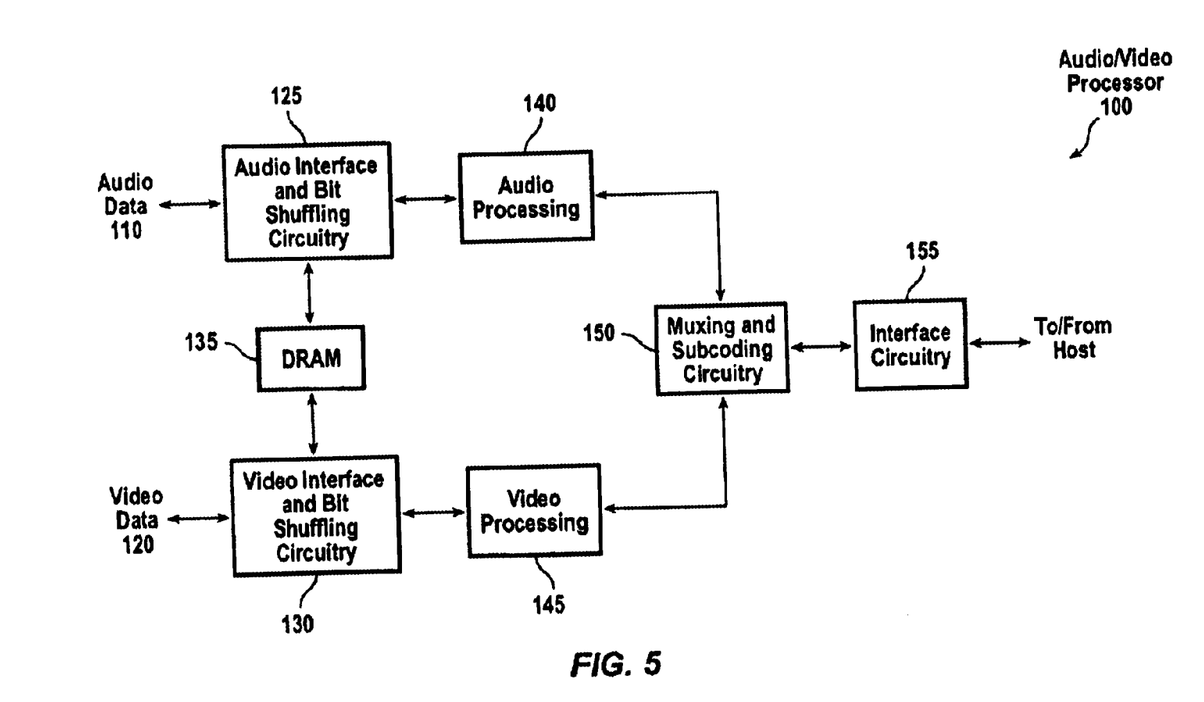
FIG. 5 illustrates a block diagram an audio/video coding/decoding apparatus according to the present invention.

A solution to the problems with the prior art is to use apparatus and methods such as that of the present invention. The present invention allows the use of standard DRAM memory while avoiding unused portions thereof. FIG. 5 illustrates a system in which a bit shuffling circuit of the present invention might be used. An audio/video processor 100 is shown if FIG. 5 as receiving both audio data 110 and video data 120. Audio data 110 is transferred to and received from an audio interface and bit shuffling circuit 125, while video data 120 is transferred to and received from a video interface and bit shuffling circuit 130. Both circuits 125 and 130 transfer data to a DRAM memory 135 in order for the bit shuffling circuitry to properly access the data stored therein. Subsequently, the shuffled audio data is passed to an audio processor 140, while shuffled video data is passed to a video processor 145. Processed audio and video data is then sent to a muxing and subcoding circuit 150, which multiplexes the audio and video data to an interface circuit 155. Interface circuit 155 communicates this data to a host system (not shown), and receives data from the host system for decoding by audio/video processor 100 in a process that is the reverse of that previously described.

Figure 6:
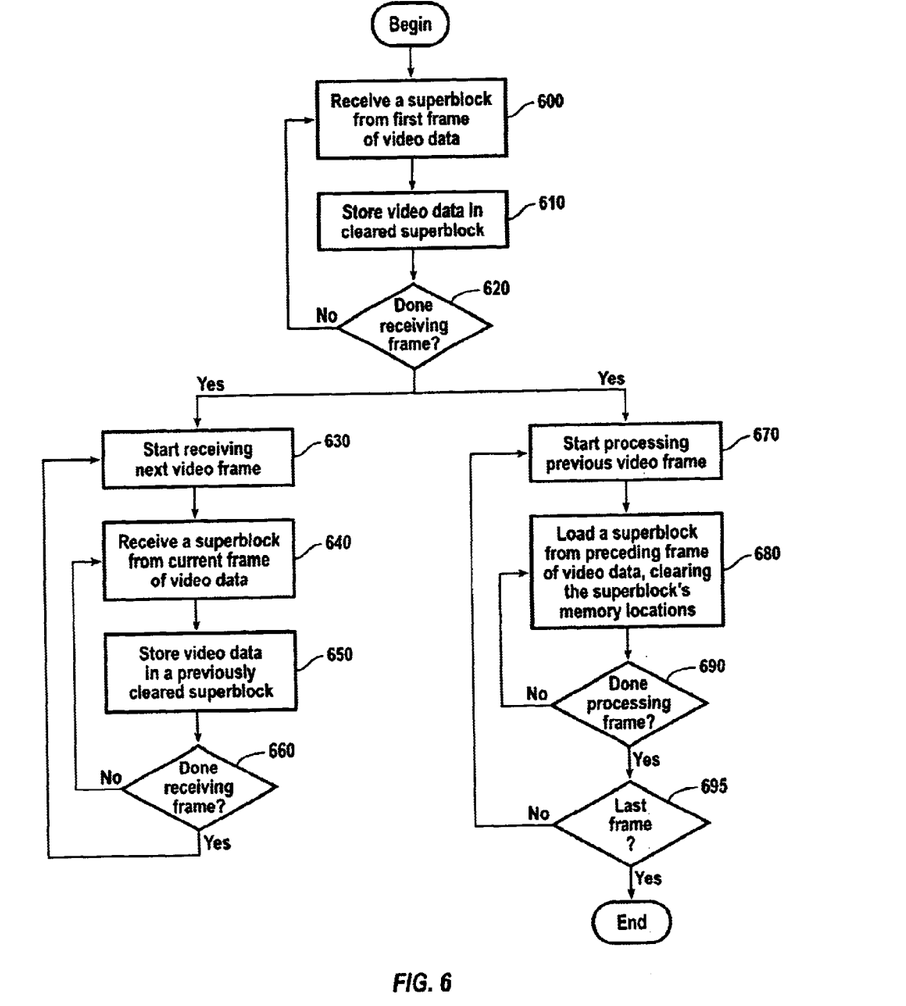
FIG. 6 illustrates a flow diagram illustrating the steps performed by a bit-shuffling circuit according to the present invention.

FIG. 6 illustrates the steps preformed in decoding a video bit stream received as video data 120. The process begins by receiving the first frame of video data, which is shown in FIG. 6 as step 600 where a superblock of the first frame of video data is received. At step 610 this superblock is stored in an unused area of DRAM memory 135. The process loops as step 620 until an entire frame has been received. At this point the process bifurcates. At step 630, reception of the next video frame is begun. At step 640 a superblock from the current frame of video data is received. At step 650 this superblock is stored in an area of DRAM memory 135 that is currently unused. At step 660, completion of the current frame's reception is determined. If the current frame is finished being received reception of the next frame is begun at step 630, once again. Simultaneously, the now-loaded video frame is processed. Processing begins at step 670, where the completely received video frame is read into video processor 145 for decompression. This process begins at step 680, where a superblock from the frame being processed is loaded into video processor 145 thus clearing that superblock's memory locations for use in receiving a superblock from a subsequent video frame. At step 690, completion of processing for the previous video frame is determined. At step 695, should the previous frame complete processing, it is determined whether the previous frame just processed was the last frame received. If this is the case the process completes.

Because a standard DRAM memory could be able to store only a single full video frame, and indeed this is desirable for reasons of cost, a method and apparatus capable of dealing with video frames on a superblock-level is required. Such a method and apparatus are provided by the present invention. In order to allow a second video frame to be loaded, the present invention loads superblocks into areas of memory where the superblocks of a proceeding video frame that have now been processed were now stored. In essence, the present invention fills the holes created by the processing of superblocks in a preceding video frame with the superblocks of a subsequent video frame. While this creates efficiency in the use of memory space, it necessitates a complex process of loading and unloading of data.

Figure 7:
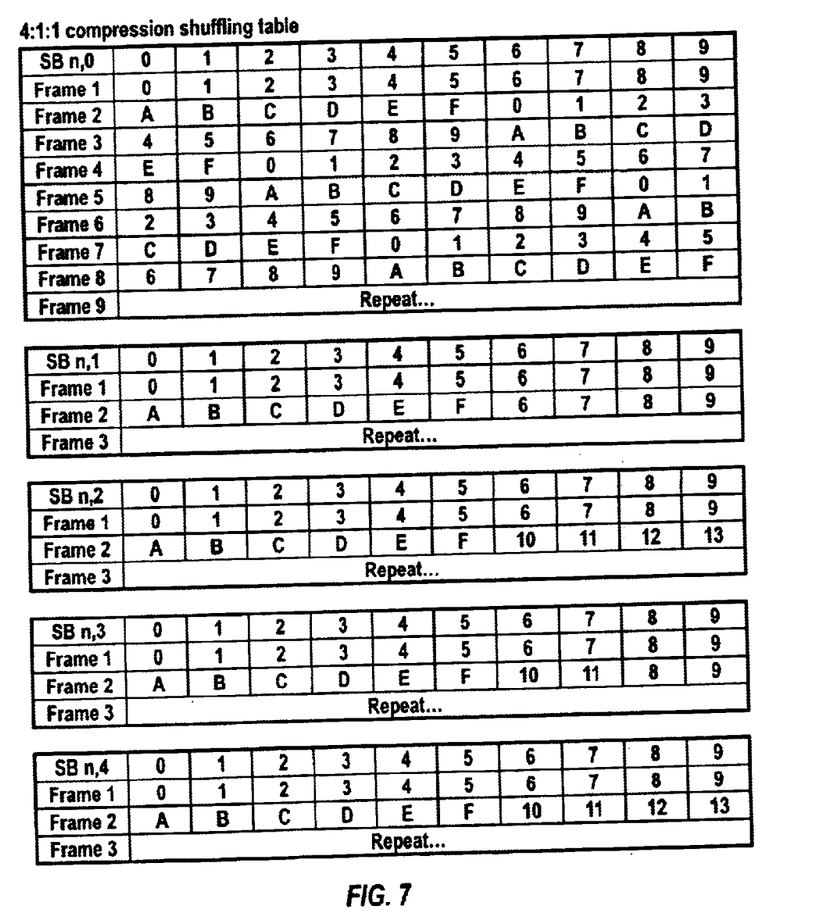
FIG. 7 illustrates a table showing the order superblocks are loaded in the present invention when compressing video using a 4:1:1 compression scheme.
Figure 8:
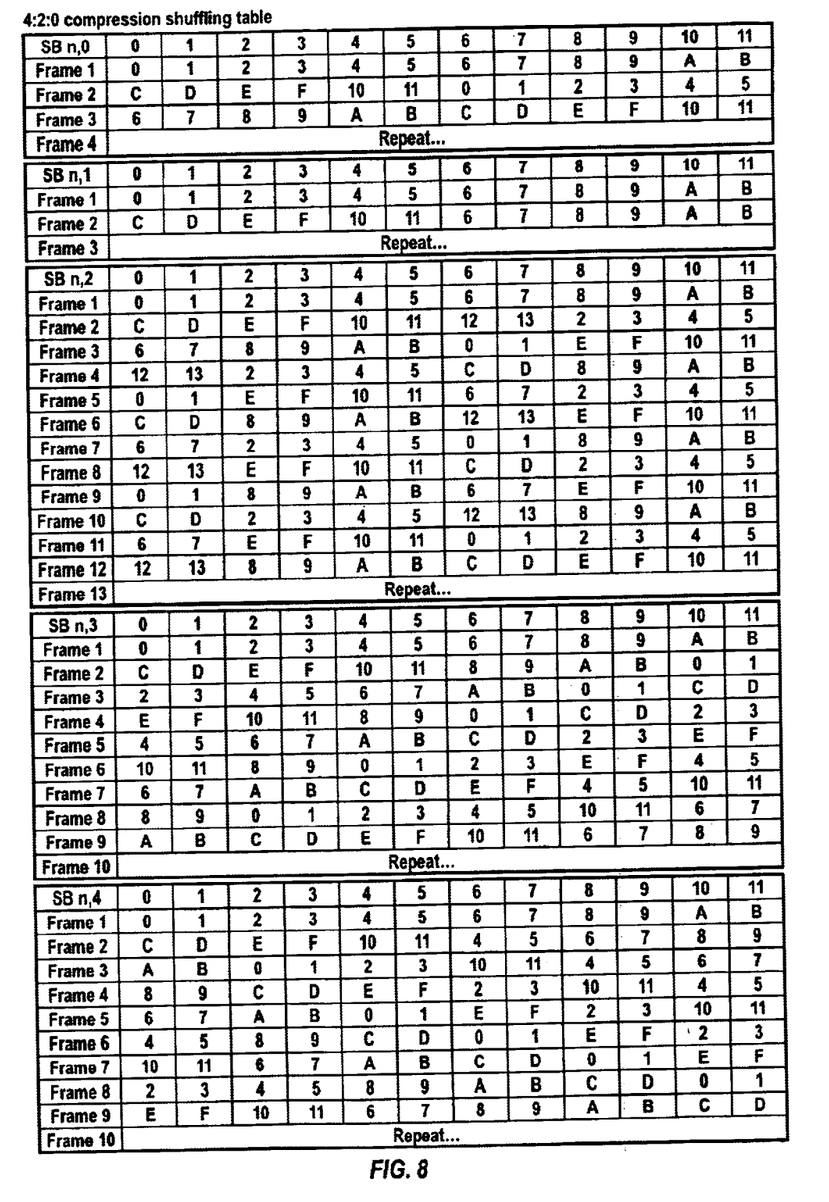
FIG. 8 illustrates a table showing the order superblocks are loaded in the present invention when compressing video using a 4:2:0 compression scheme.
Figure 9:
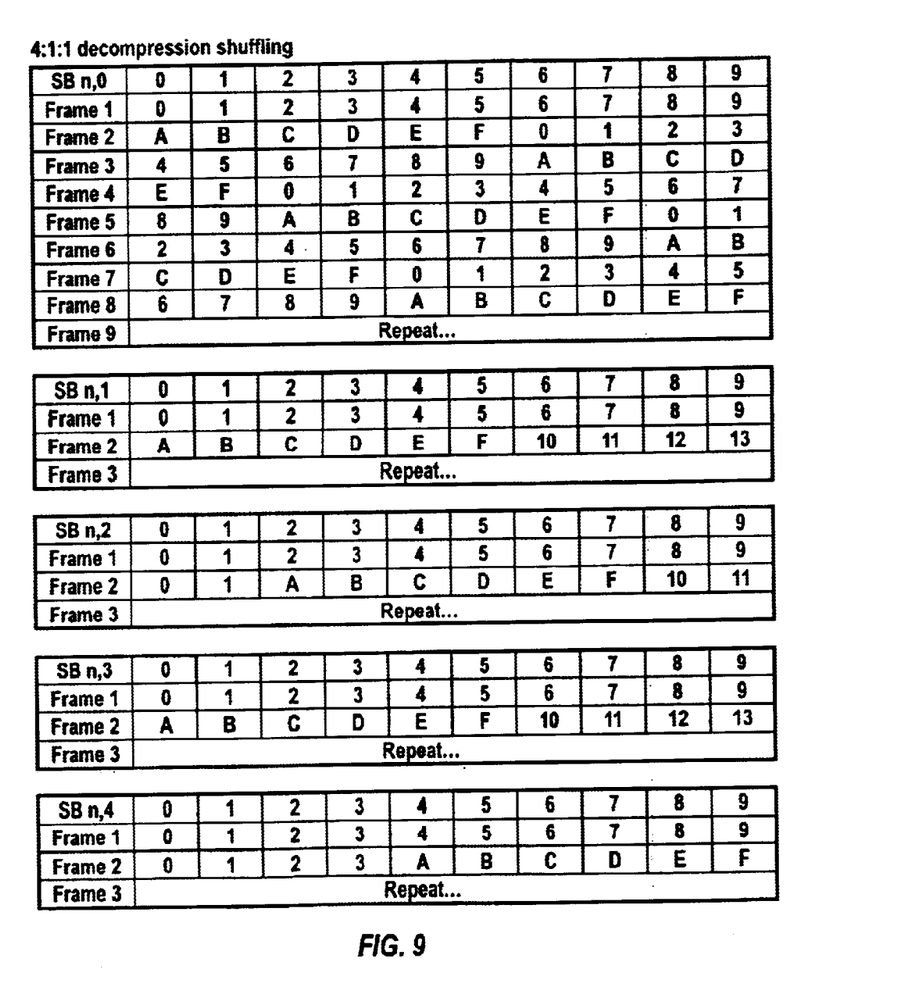
FIG. 9 illustrates a table showing the order superblocks are loaded in the present invention when decompressing video using a 4:1:1 decompression scheme.
Figure 10:
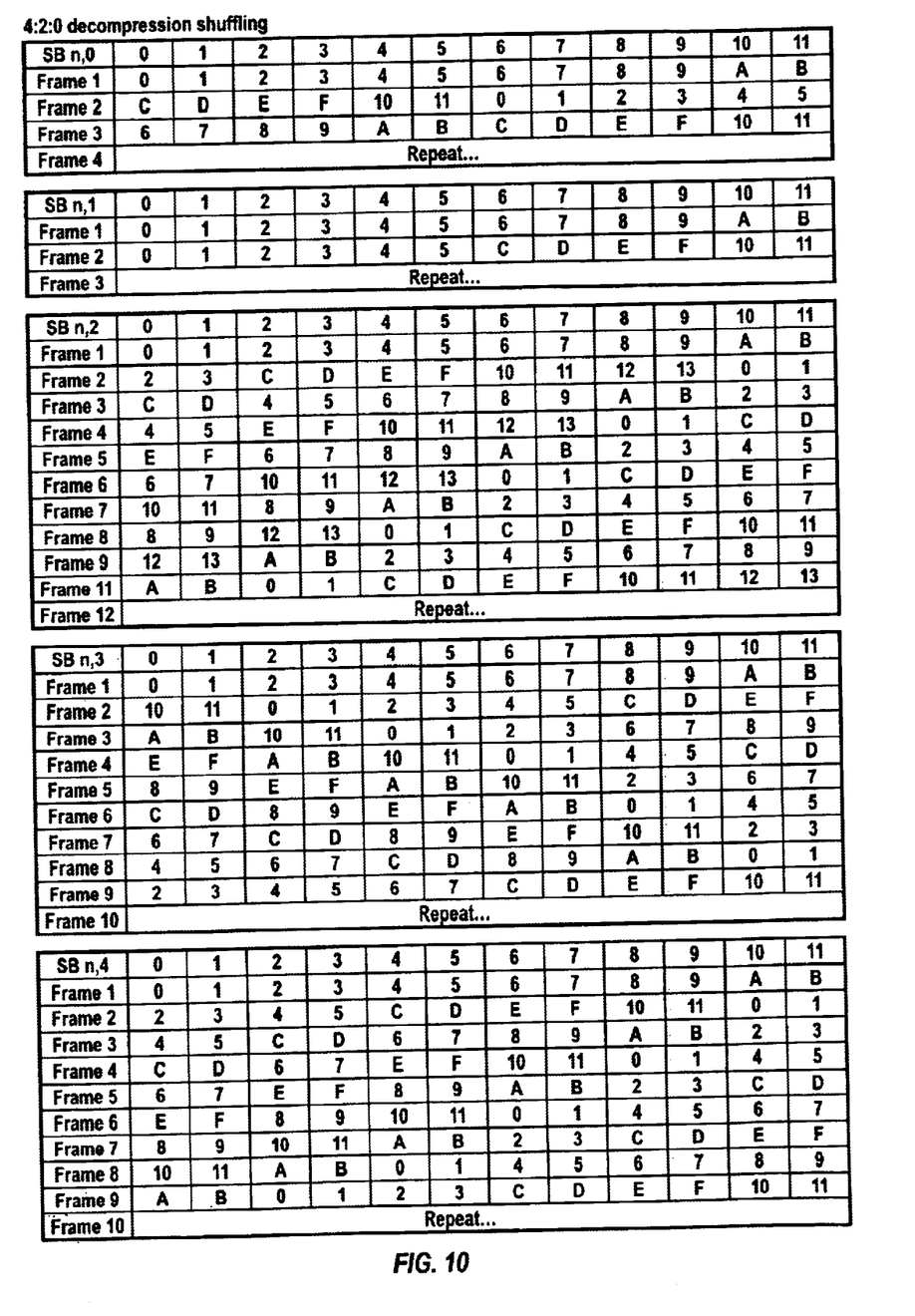
FIG. 10 illustrates a table showing the order superblocks are loaded in the present invention when decompressing video using a 4:2:0 decompression scheme.
Figure 11A:
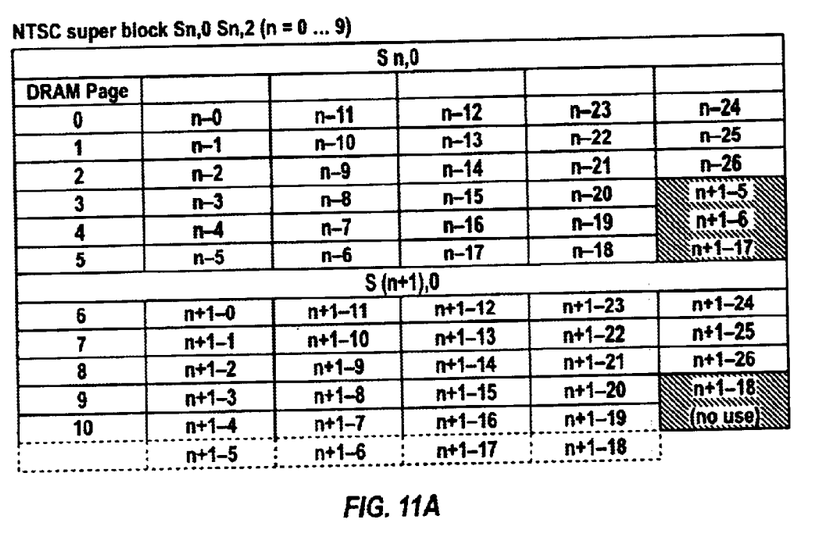
FIG. 11A illustrates a table showing the storage scheme for data representing digitized NTSC video frames for superblocks in rows 0 and 2, according to the present invention.
Figure 11B:
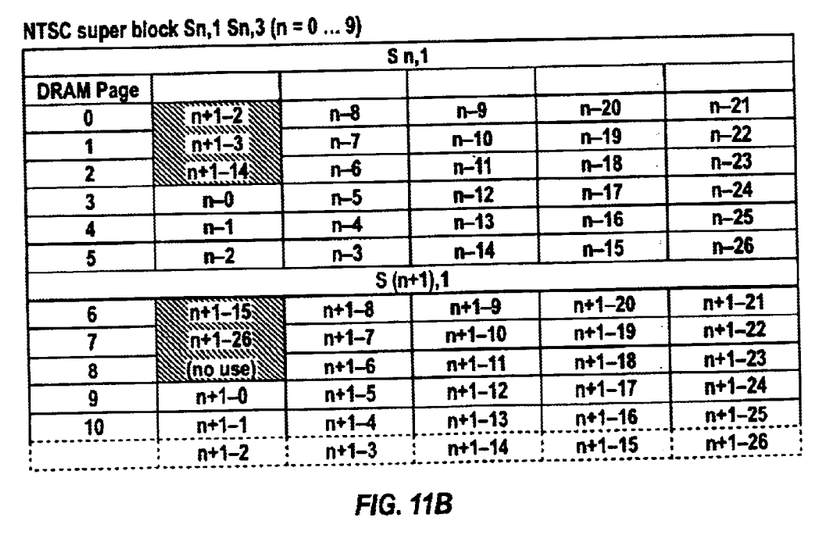
FIG. 11B illustrates a table showing the storage scheme for data representing digitized NTSC video frames for superblocks in rows 1 and 3, according to the present invention.
Figure 11C:
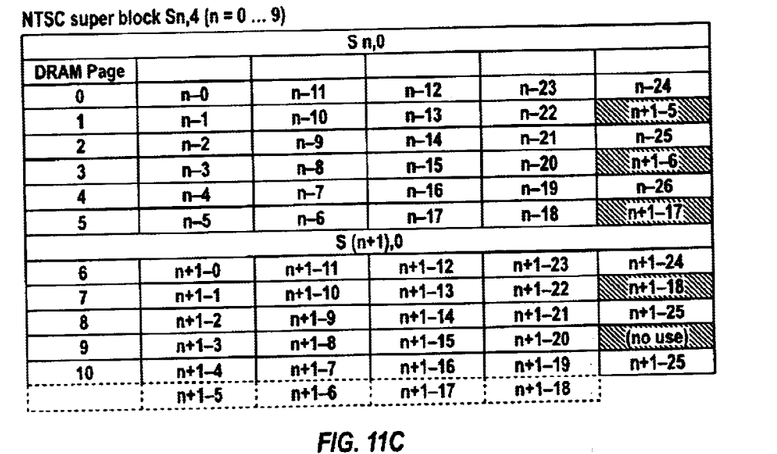
FIG. 11C illustrates a table showing the storage scheme for data representing digitized NTSC video frames for superblocks in row 4, according to the present invention.
Figure 11D:
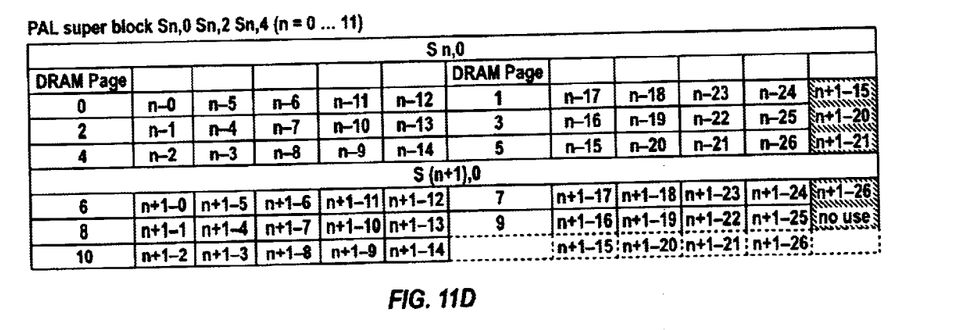
FIG. 11D illustrates a table showing the storage scheme for data representing digitized PAL video frames for any superblock therein, according to the present invention.

Such a process concerns itself with the ordering and location of the loading and unloading of superblocks within DRAM memory 135. Such orderings are illustrated in FIGS. 7 and 8 (compression), and FIGS. 9 and 10 (decompression). Thus, following the order illustrated in these figures, data may by loaded and unloaded continuously from a standard DRAM memory (e.g. 8 MB memory for either NTSC or PAL video formats). The FIGS. 11A, 11B, 11C, and 11D illustrate the storage of the three types of NTSC superblocks and one type of PAL superblock according to the present invention. These figures show the DRAM page numbers corresponding to the various superblocks. By using such addressing scheme, the storage of superblocks can efficiently take advantage of DRAM memory capable of fast-page mode operation.

The present invention provides several benefits. First, standard DRAM chips may be employed. This avoids the extra expense of specialized video RAM (VRAM) chips, static graphics RAM (SGRAM) chips, or other such memory solutions. The use of custom application specific memory (ASM) chips is also avoided. The use of standard DRAM chips also implies that the compatibility problems normally associated with such proprietary solutions are avoided. The present invention also provides picture quality meeting the digital video standard, while maintaining the necessary throughput rate.

The techniques of the present invention are therefore readily implemented in an integrated circuit to allow the efficient compression and decompression of digitally encoded images, while employing standard DRAM chips. The techniques of the present invention comply with the Digital Video Standard (the "Blue Book", or DV-SD standard). These techniques can also be of use in systems implementing other standards, such as the International Standards Organization's (ISO) Joint Photographic Experts Group (JPEG) standard, ISO DIS 10918-1, and is JPEG-compliant, as set forth in ISO DIS 10918-2. These standards are included by reference herein, in their entirety. Moreover, the techniques of the present invention can be understood in the framework of a JPEG image compression/decompression system, such as that outline in "JPEG Still Image Data Compression Standard" by W. B. Pennebaker and J. L. Mitchell, which is also included by reference herein, in its entirety.

As will be understood by those with ordinary skill in the art, the present invention may be embodied in other specific forms without departing from the spirit or essential characteristics thereof. For example, the techniques of the present invention can also be applied to other compression systems such as the standards specified by Motion Picture Experts Group (MPEG), or MPEGII. These standards are included by reference herein, in their entirety and for all purposes.

Alternately, the techniques of the present invention can be implemented in a computer system. For example, the systems of FIG. 5 can be implemented on a peripheral component interconnect (PCI) card. The PCI card can be installed onto the PCI bus of a personal computer. Also, other bus technologies such as NUBUS, ISA, EISA, Universal Serial Bus (USB), 1394 bus, and Accelerated Graphics Port (AGP) can also be utilized. Also, the techniques of the present invention can be implemented by utilizing the available routines and features such as caching, new instruction sets, and single instruction multiple data (SIMD) tools which are provided by Intel® Corporation's MMX™ technology, Advance Micro Device,® Inc.'s 3DNow!™ technology, and their equivalents. Additionally, even though the techniques of the present invention(such as specified in appendix B) have been discussed with respect to DCT transformation other types of transformations can also be utilized such as wavelet transform and vector quantization (VQ). Accordingly, for an understanding of the scope of the invention, reference should be made to the appended claims.

Also, having fully described certain features of the preferred embodiments of the present invention, many other equivalent or alternative techniques of implementing bit-shuffling according to the present invention will be apparent to those skilled in the art. Other signal processing applications that employ such bit streams may benefit from the present invention. Also, the implementation shown in the figures is but one of many possible architectures which may be designed to take advantage of the method of the present invention. These equivalents and alternatives, and others, are intended to be included within the scope of the present invention.

What is claimed is:

1. A method for encoding of video data, the method comprising:

storing each of M blocks of a first frame of the video data in a different one of M storage locations of a memory having N storage locations; wherein N is greater than M;

storing each of N-M blocks of a second frame of the video data in a different one of remaining N-M storage locations of the memory; and processing the M blocks of the first frame, wherein the storing of the N-M blocks of the second frame is performed while the M blocks of the first frame are being processed.

2. A method for encoding of video data, the method comprising:

storing each of M blocks of a first frame of the video data in a different one of M storage locations of a memory having N storage locations; wherein N is greater than M;

storing each of N-M blocks of a second frame of X video data in a different one of remaining N-M storage locations of the memory; and processing the M blocks of the first frame, wherein the storing of the N-M blocks of the second frame is performed while the M blocks of the first fame are being processed, wherein said memory is a dynamic random access memory.

3. A method for encoding of video data, the method comprising:

storing each of M blocks of a first frame of the video data in a different one of M storage locations of a memory having N storage locations; wherein N is greater than M;

storing each of N-M blocks of a second frame of the video data in a different one of remaining N-M storage locations of the memory; and processing the M blocks of the first frame, wherein the storing of the N-M blocks of the second frame is performed while the M blocks of the first frame are being processed, wherein each block of the first and second frames is a superblock.

* * * * *